United States Patent
Agarwal et al.

(10) Patent No.: US 12,088,496 B2
(45) Date of Patent: Sep. 10, 2024

(54) ON-SITE ARTIFICIAL INTELLIGENCE APPLICATION PROGRAMMING INTERFACES FOR ROUTING AND ADAPTING TRAFFIC

(71) Applicant: Accenture Global Solutions Limited, Dublin (IE)

(72) Inventors: Rajul Agarwal, Bengaluru (IN); Teresa Sheausan Tung, Los Angeles, CA (US); Bepeta Mallikarjun, Toronto (CA); Venkata Narasimhan Koduvayur Raghuram, Toronto (CA)

(73) Assignee: Accenture Global Solutions Limited, Dublin (IE)

( * ) Notice: Subject to any disclaimer, the term of this patent is extended or adjusted under 35 U.S.C. 154(b) by 60 days.

(21) Appl. No.: 17/825,579

(22) Filed: May 26, 2022

(65) Prior Publication Data

US 2023/0388226 A1 Nov. 30, 2023

(51) Int. Cl.
*H04L 45/42* (2022.01)
*G06N 20/00* (2019.01)
*H04L 9/32* (2006.01)
*H04L 45/00* (2022.01)

(52) U.S. Cl.
CPC ............ *H04L 45/42* (2013.01); *G06N 20/00* (2019.01); *H04L 9/3213* (2013.01); *H04L 45/566* (2013.01)

(58) Field of Classification Search
CPC ..... H04L 45/42; H04L 45/566; H04L 9/3213; H04L 41/0631; H04L 41/0695; H04L 41/16; G06N 3/045; G06N 20/00; G06N 3/0455

USPC ................. 709/217–224, 230–232, 235, 242
See application file for complete search history.

(56) References Cited

U.S. PATENT DOCUMENTS

| | | | |
|---|---|---|---|
| 2014/0282626 A1* | 9/2014 | Muguda | G06F 9/54 719/328 |
| 2019/0384617 A1 | 12/2019 | Jain et al. | |
| 2020/0259700 A1* | 8/2020 | Bhalla | G06N 20/00 |
| 2020/0374394 A1* | 11/2020 | Karp | H04W 4/16 |
| 2021/0006496 A1* | 1/2021 | Xiong | H04Q 9/00 |
| 2021/0064452 A1* | 3/2021 | Nigam | H04L 41/0609 |

(Continued)

OTHER PUBLICATIONS

Cynthia Countouris, "Top 3 Pillars of AI Enabled Edge Computing in Retail", Sep. 9, 2021, 3 pages, NVIDIA, https://developer.nvidia.com/blog/top-3-pillars-of-ai-enabled-edge-computing-in-retail/.

(Continued)

*Primary Examiner* — Chirag R Patel
(74) *Attorney, Agent, or Firm* — Polsinelli PC

(57) ABSTRACT

In some implementations, an application programming interfaces (API) manager may receive, at a set of artificial intelligence (AI) APIs, a set of inputs from a set of on-site devices. Accordingly, the API manager may route the set of inputs to a corresponding set of remote servers and may receive, from at least one server of the corresponding set of remote servers, at least one response based on at least one input, from the set of inputs, routed to the at least one server. The API manager may transmit the at least one response to a corresponding device from the set of on-site devices. Further, the API manager may modify at least one API, of the set of AI APIs, based on a traffic pattern associated with the set of inputs and the at least one response.

20 Claims, 14 Drawing Sheets

(56) References Cited

U.S. PATENT DOCUMENTS

2021/0216308 A1    7/2021   Vyas et al.
2022/0066848 A1*  3/2022   Cho .................. H04L 43/50

OTHER PUBLICATIONS

Erica Stevens, "Retail Data Comes Together at the In-Store Edge", Mar. 23, 2020, 5 pages, insight.tech, https://www.insight.tech/content/retail-data-comes-together-at-the-in-store-edge#/main-content.

Ishu Verma, "Developing at the edge: Best practices for edge computing", Jul. 16, 2020, 6 pages, Red Hat Summit, Red Hat Developer, https://developers.redhat.com/blog/2020/07/16/developing-at-the-edge-best-practices-for-edge-computing#technology_best_practices_for_edge_development.

John Walicki, et al., "Deploying containerized software to edge devices", Aug. 10, 2021, 7 Pages, IBM Developer, IBM, https://developer.IBM.com/articles/deploying-containerized-software-to-edge-devices/.

"The Leading Edge AI Platform For Computer Vision", retrieved on May 26, 2022, 8 pages, Chooch, Chooch Intelligence Technologies Co., https://chooch.ai/edge-ai/.

"Recommended Partners", retrieved on May 26, 2022, 6 pages, Section, https://www.section.io/recommended-partners.

Yida, "What is Edge AI and What is Edge AI Used for?", retrieved on May 26, 2022, 17 pages, Magazine 7, https://www.seeedstudio.com/blog/2020/01/20/what-is-edge-ai-and-what-is-it-used-for/.

Extended European Search Report for Application No. EP22192709.8, mailed on Feb. 22, 2023, 9 pages.

\* cited by examiner

ON-SITE ARTIFICIAL INTELLIGENCE APPLICATION PROGRAMMING INTERFACES FOR ROUTING AND ADAPTING TRAFFIC

BACKGROUND

On-site devices, such as cameras, scanners, and point-of-sale (PoS) systems, among other examples, often exchange data with a cloud or a standalone remote server. For example, the cloud or the remote server may provide one or more application programming interfaces (APIs) for the on-site devices to use. Accordingly, the on-site devices may transmit information using the API(s), and the cloud or the remote server may respond to the on-site devices. For example, a camera may transmit captured images to the cloud or the remote server such that a stored preference with a person identified in the images is updated and/or that an inventory list is updated based on product identified in the images. In another example, a scanner may transmit a captured barcode to the cloud or the remote server such that the inventory list is updated and/or that the scanner receives an indication of price in response to the captured barcode. In another example, a PoS system may transmit a request to the cloud or the remote server based on input associated with a coupon such that the scanner receives a verification of the coupon and/or that a stored preference with a user account identified in the request is updated.

SUMMARY

Some implementations described herein relate to a method. The method may include receiving, at a set of artificial intelligence (AI) application programming interfaces (APIs), a set of inputs from a set of on-site devices. The method may include routing the set of inputs to a corresponding set of remote servers. The method may include receiving, from at least one server of the corresponding set of remote servers, at least one response based on at least one input, from the set of inputs, routed to the at least one server. The method may include transmitting the at least one response to a corresponding device from the set of on-site devices. The method may include modifying at least one API, of the set of AI APIs, based on a traffic pattern associated with the set of inputs and the at least one response.

Some implementations described herein relate to a device. The device may include one or more memories and one or more processors communicatively coupled to the one or more memories. The one or more processors may be configured to receive, at a set of AI APIs, a set of inputs from a set of on-site devices. The one or more processors may be configured to route the set of inputs to a corresponding set of remote servers. The one or more processors may be configured to receive, from at least one server of the corresponding set of remote servers, at least one response based on at least one input, from the set of inputs, routed to the at least one server. The one or more processors may be configured to transmit the at least one response to a corresponding device from the set of on-site devices. The one or more processors may be configured to modify at least one API, of the set of AI APIs, based on a traffic pattern associated with the set of inputs and the at least one response.

Some implementations described herein relate to a non-transitory computer-readable medium that stores a set of instructions for a device. The set of instructions, when executed by one or more processors of the device, may cause the device to receive, at a set of AI APIs, a set of inputs from a set of on-site devices. The set of instructions, when executed by one or more processors of the device, may cause the device to route the set of inputs to a corresponding set of remote servers. The set of instructions, when executed by one or more processors of the device, may cause the device to receive, from at least one server of the corresponding set of remote servers, at least one response based on at least one input, from the set of inputs, routed to the at least one server. The set of instructions, when executed by one or more processors of the device, may cause the device to transmit the at least one response to a corresponding device from the set of on-site devices. The set of instructions, when executed by one or more processors of the device, may cause the device to modify at least one API, of the set of AI APIs, based on a traffic pattern associated with the set of inputs and the at least one response.

DETAILED DESCRIPTION

Figure 1A:
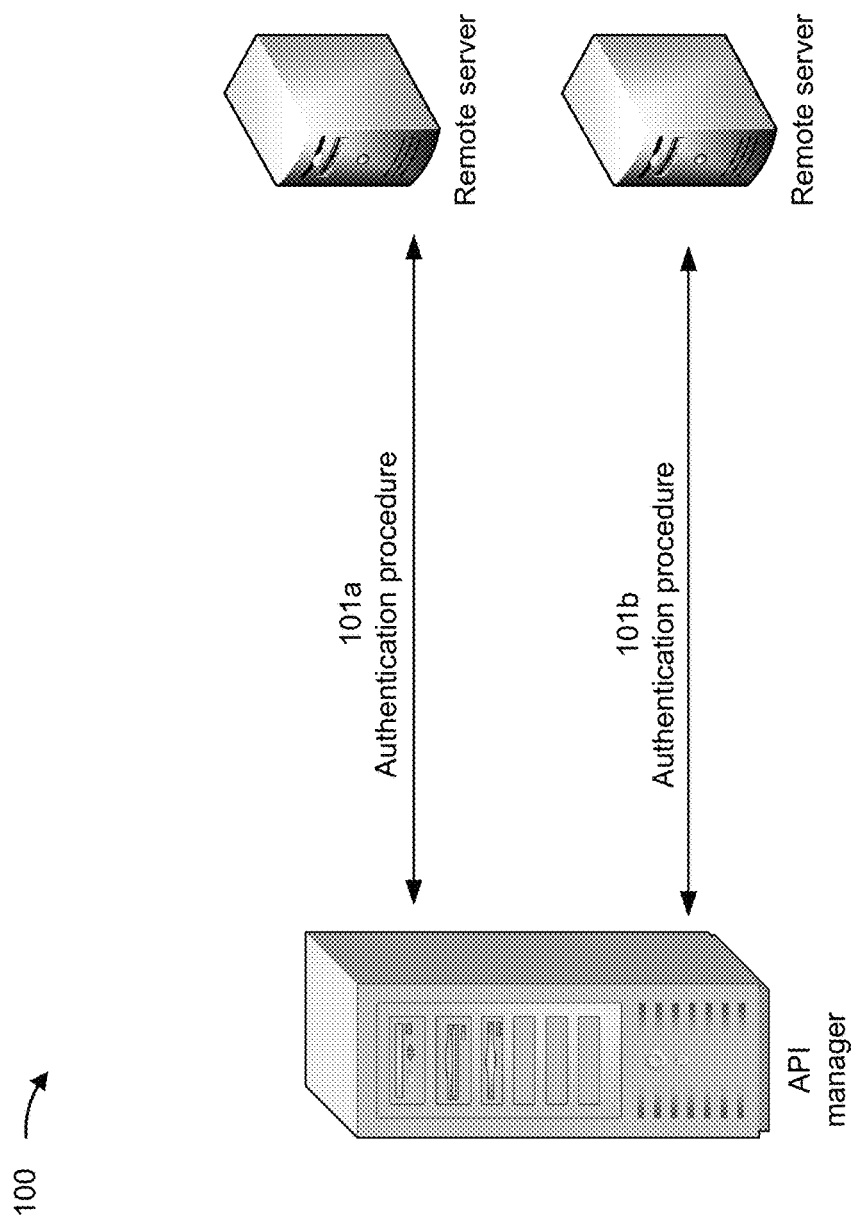
FIGS. 1A-1F are diagrams of an example implementation described herein.

The following detailed description of example implementations refers to the accompanying drawings. The same reference numbers in different drawings may identify the same or similar elements.

On-site devices, such as cameras, scanners, and point-of-sale (PoS) systems, among other examples, often exchange data with a cloud or a standalone remote server. For example, the cloud or the remote server may provide one or more application programming interfaces (APIs) for the on-site devices to use. However, because different devices contact different servers, latency can increase when traffic at one particular server or a particular API is high. Additionally, each remote server manages its own APIs, which generally results in some APIs being subject to attacks, such as data exfiltrations, advanced persistent threats (APTs), memory injections, distributed denial of service (DDoS) attacks, and other security vulnerabilities.

Implementing APIs on-site and with artificial intelligence (AI) reduces latency and improves security. Some implementations described herein enable an API manager to provision a set of APIs for a set of on-site devices. As a result, latency is reduced because the APIs are provisioned closer to the on-site devices. Additionally, the API manager uses AI to provision additional API instances and/or cache inputs in order to reduce latency when traffic is high. The API manager additionally uses AI to monitor analytics associated with the set of APIs and thus detect and mitigate security risks early. The analytics monitored by the API manager can also be used to improve inter-operability of the on-site devices.

FIGS. 1A-1F are diagrams of an example implementation 100 associated with using on-site AI APIs. As shown in FIGS. 1A-1F, example implementation 100 includes an API manager, a plurality of remote servers, and a plurality of on-site devices. These devices are described in more detail below in connection with FIG. 5 and FIG. 6.

As shown by reference numbers 101a and 101b, the API manager may perform a set of authentication procedures with the set of remote servers. Although shown as using a single authentication procedure for each remote server, the API manager may perform a plurality of authentication procedures (e.g., a login procedure followed by a request for administrative access). Additionally, or alternatively, although shown using two remote servers, the API manager may communicate with additional remote servers. In some implementations, the API manager may use a login (e.g., a username, a password, a passcode, and/or another type of authentication information) from a user of the API manager to perform at least one of the authentication procedures. For example, the authentication procedure may be as described in connection with FIGS. 2A-2B. Additionally, or alternatively, the API manager may use private keys associated with the API manager (and/or the on-site devices associated with the API manager) to perform at least one of the authentication procedures.

Accordingly, the API manager may receive a set of access tokens based on the set of authentication procedures. Although described using access tokens, other authentication data structures may be used. For example, the API manager may receive encryption keys, verification codes, and/or similar types of authenticating data.

Figure 1B:
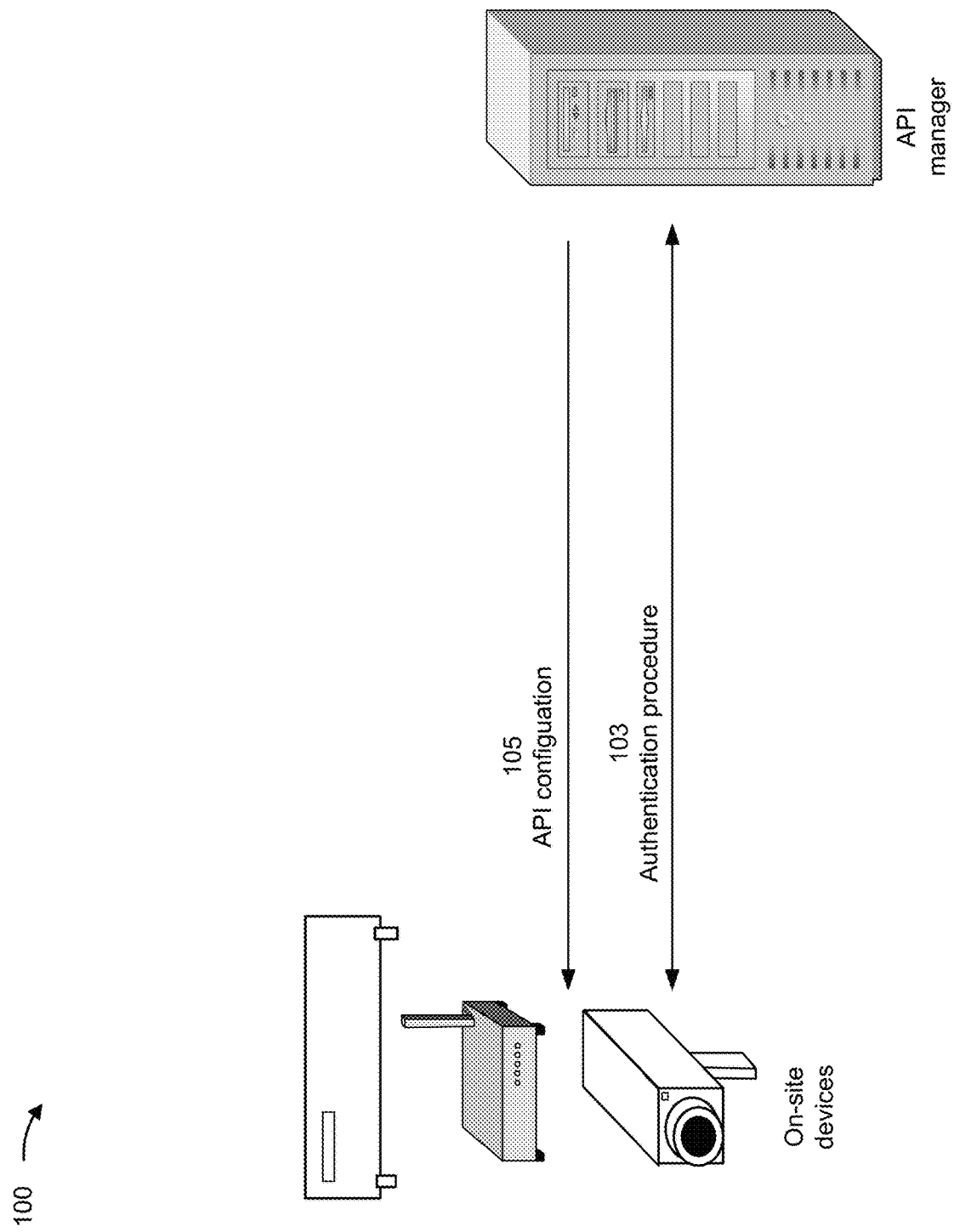

As shown in FIG. 1B and by reference number 103, the API manager may additionally perform a set of authentication procedures with the set of on-site devices. For example, the API manager may use a login (e.g., a username, a password, a passcode, and/or another type of authentication information) from a user of the API manager and/or a private key associated with the API manager to perform at least one of the authentication procedures. In some implementations, the API manager may receive a private key, an access code, and/or another type of response from the on-site devices and use the response in authenticating with the remote servers, as described above.

Additionally, as shown by reference number 105, the API manager may transmit, and the on-site devices may receive, corresponding indications of API configurations to use. For example, the API manager may indicate destination addresses (e.g., Internet protocol (IP) addresses, medium access control (MAC) addresses, virtual machine names, and/or other similar identifiers) for the on-site devices to use for API calls.

Figure 1C:
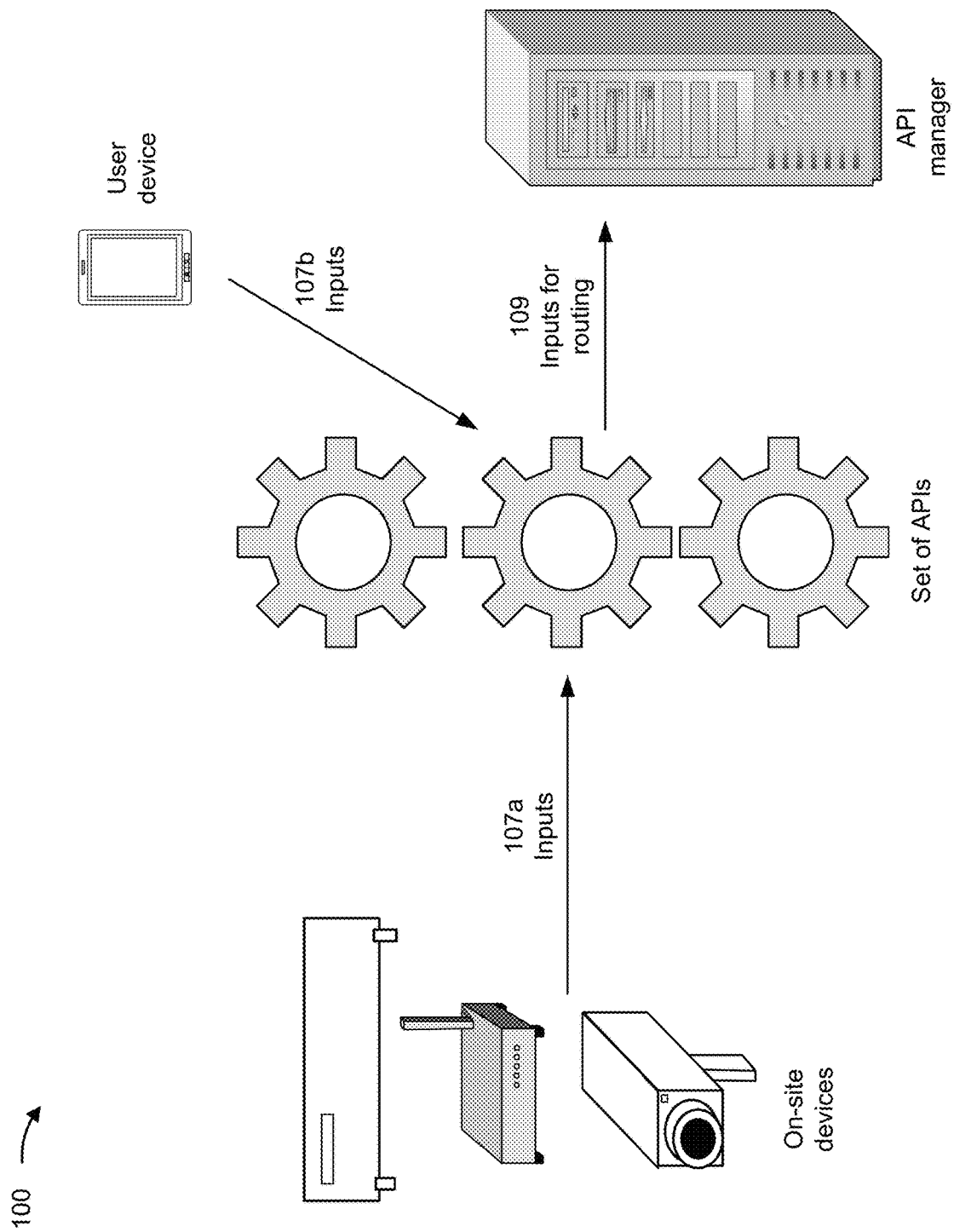

Accordingly, as shown in FIG. 1C and by reference number 107a, the on-site devices may transmit a set of inputs. For example, the on-site devices may perform calls to the set of AI APIs (e.g., as indicated to the on-site devices) to push input to the API manager. The input may include multimedia (e.g., captured by optical sensors and/or audio sensors), barcodes from a scanner, and/or product information and/or payment information from a PoS system, among other examples.

Additionally, or alternatively, and as shown by reference number 107b, a user device may transmit input. For example, an application layer associated with the user device may route input from the user device to the API manager (e.g., via the Internet). The input may include membership information and/or discount information associated with an account.

Accordingly, as shown by reference number 109, the API manager may receive the set of inputs using the set of AI APIs (e.g., as indicated to the on-site devices). In some implementations, the input from one or more of the on-site devices may be encrypted. For example, the on-site device and/or the API manager may encrypt the input based on a corresponding access token associated with a corresponding server of the set of remote servers. Accordingly, the API manager may secure inputs from the on-site devices based on corresponding authentication procedures with the remote servers.

Figure 1D:
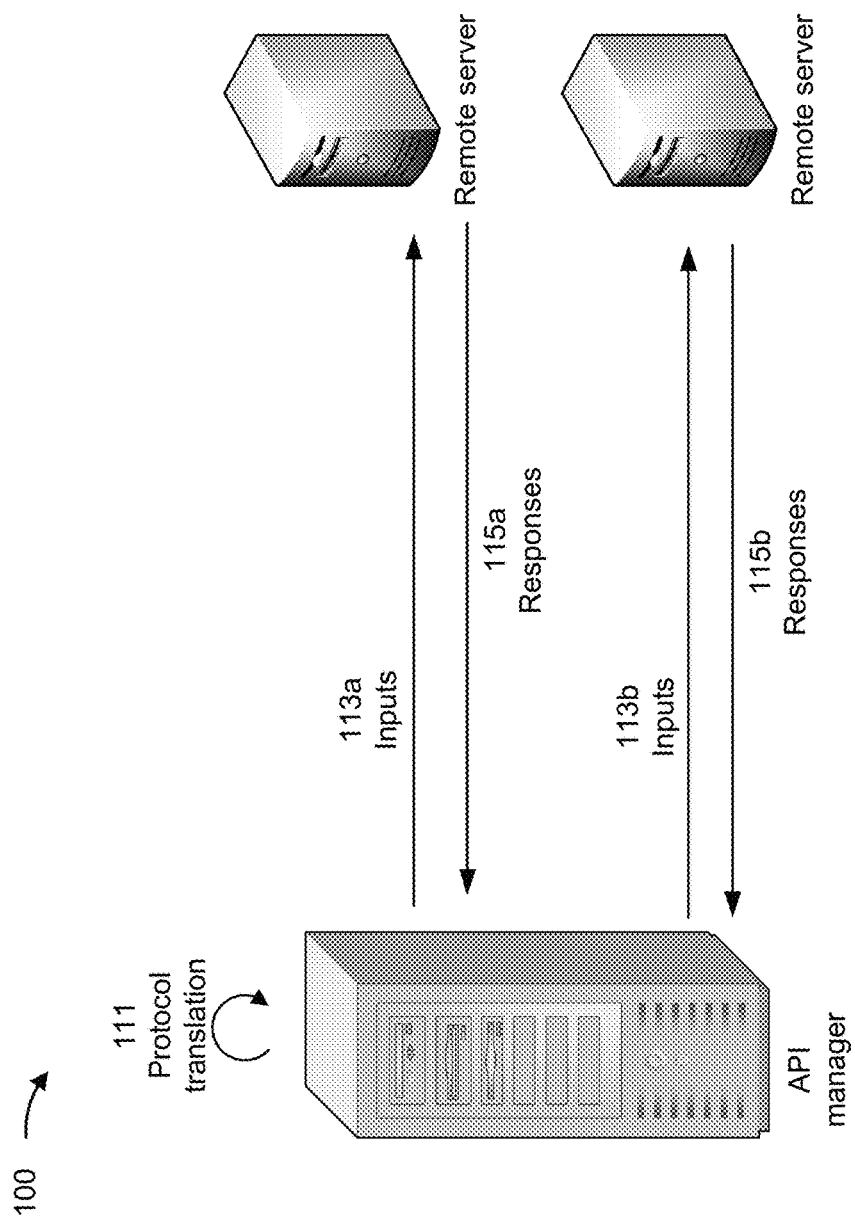

As shown in FIG. 1D and by reference number 111, the API manager may perform protocol translation (and/or adaptation). For example, the API manager may translate input from one of the on-site devices from a first protocol used by the on-site device to a second protocol used by the corresponding remote server. In some implementations, the translation may include reorganizing data of the input from a first structure associated with the first protocol into a second structure associated with the second protocol. For example, the API manager may re-package a SOAP (also referred to as "simple object access protocol") message structure as a JavaScript object notation (JSON) file.

Additionally, or alternatively, the translation may include exchanging messages with the corresponding server according to the second protocol based on messages exchanged with the corresponding device according to the first protocol. For example, the API manager may exchange representational state transfer (REST) API messages with the on-site device but exchange corresponding webhook and/or a remote procedure call (RPC) messages with the corresponding remote server.

Accordingly, as shown by reference numbers 113a and 113b, the API manager may route the set of inputs to the corresponding set of remote servers. In some implementations, as described above, one or more of the inputs may be encrypted based on corresponding authentication procedures with the remote servers. The inputs may be encrypted by the on-site devices, encrypted at the API manager, or decrypted when received at the API manager and re-encrypted for transmission to the remote servers.

Therefore, as shown by reference numbers 115a and 115b, the API manager may receive, from at least one of the remote servers, at least one response based on at least one of the inputs. For example, some inputs may be a one-way exchange from the on-site device to the corresponding remote server. In one example, a camera or a microphone may transmit images and/or audio of customer and/or product activity for the corresponding remote server to process without expecting a response. However, other inputs may be a two-way exchange such that the corresponding remote server transmits a response to the API manager. In one example, a PoS system may transmit customer information and/or discount information and expect the corresponding remote server to verify the transmitted information.

Figure 1E:
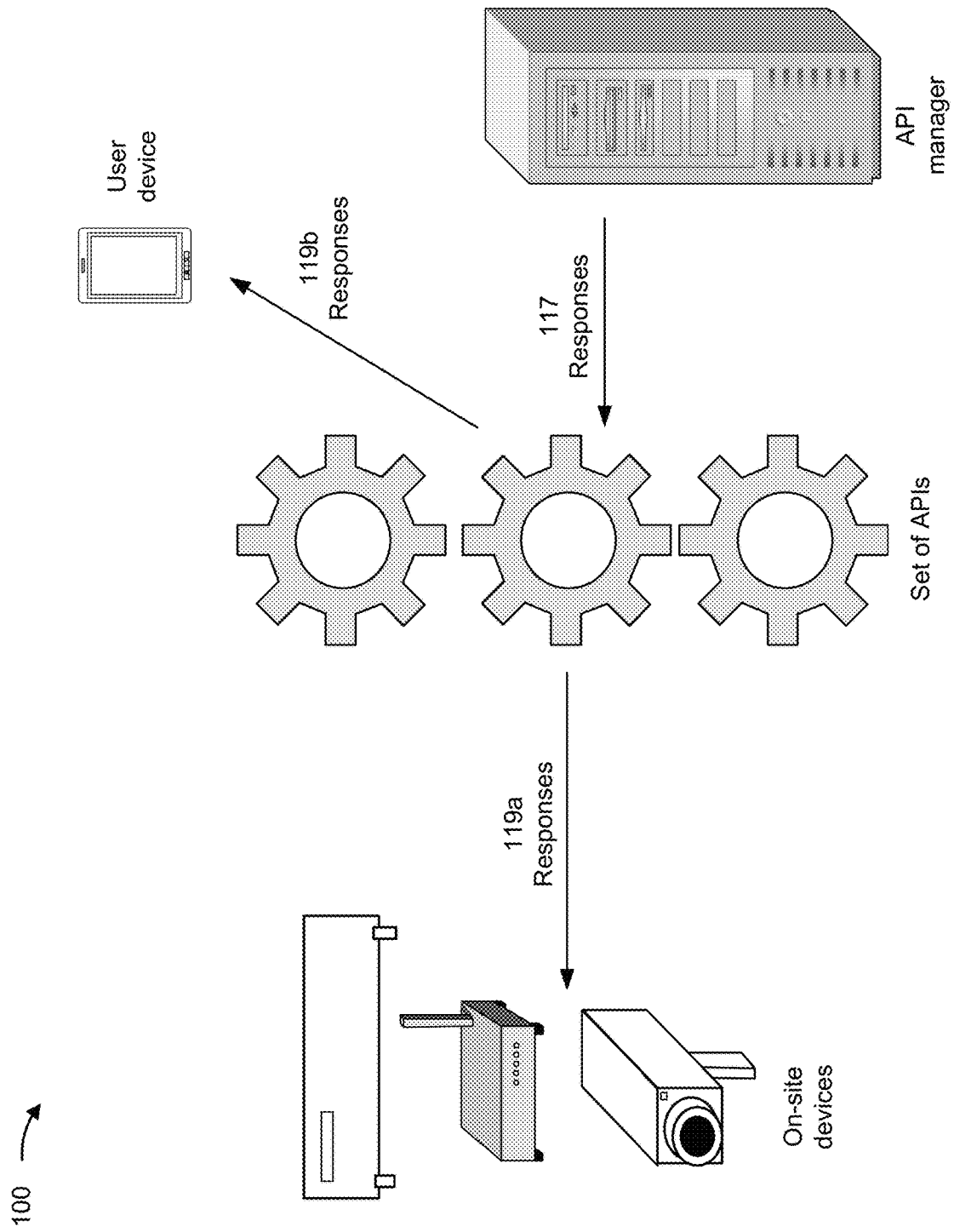

Accordingly, as shown in FIG. 1E and by reference number 117, the API manager may use the set of AI APIs (e.g., as indicated to the on-site devices) to distribute the responses. For example, as shown by reference number 119a, the on-site devices may receive the set of responses. For example, the on-site devices may receive returns from the set of AI APIs (e.g., as indicated to the on-site devices)

based on initial calls to those AI APIs. The responses may include verifications (e.g., of customer, product, and/or discount data) and/or updates (e.g., to an inventory list and/or to a list of recommended discounts), among other examples.

Additionally, or alternatively, and as shown by reference number 119b, the user device may receive a response. For example, an application layer associated with the user device may receive a response from the API manager routed to the user device (e.g., via the Internet). The response may include verification of membership information and/or discount information associated with an account.

Figure 1F:
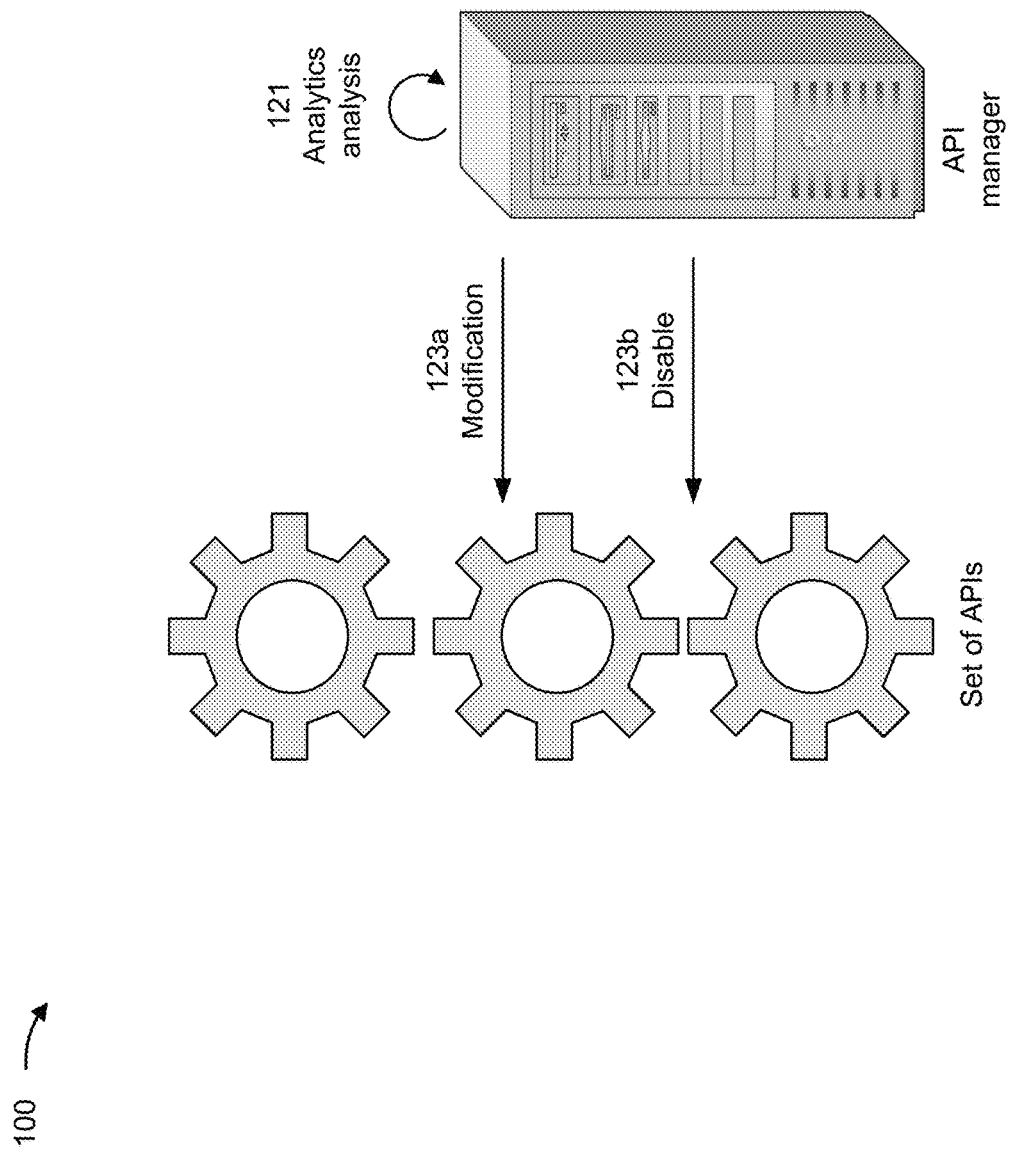

As shown in FIG. 1F and by reference number 121, the API manager may track analytics associated with the AI APIs. For example, the API manager may anonymize at least a portion of the set of inputs and store the anonymized portion for analytics. Accordingly, the API manager may generate and output reports on traffic patterns (e.g., sizes, frequencies, and response times associated with inputs at different APIs). Further, the API manager may recommend changes to the AI APIs in order to further increase speed associated with the AI APIs. For example, the API manager may use a machine learning model, as described in connection with FIGS. 4A-4B, to recommend changes to a structure of the AI APIs (e.g., new destination addresses, new input requirements, new response requirements, among other examples).

Additionally, or alternatively, as shown by reference number 123a, the API manager may modify at least one of the APIs based on a traffic pattern associated with the set of inputs and the responses. For example, the API manager may generate at least one new instance of the API based on the traffic pattern. Accordingly, the API manager may update a configuration transmitted to the on-site devices using the API. As a result, multiple on-site devices may use the API but with different destination addresses such that the API manager may process more traffic and reduce latency. Additionally, or alternatively, the API manager may allocate at least one cache associated with the API based on the traffic pattern. Accordingly, the API manager may conserve processing resources and network overhead that would be used to update a configuration transmitted to the on-site devices using the API while also allowing the on-site devices to execute other processing threads while awaiting a response from the API (e.g., because the input is cached rather than awaiting confirmation that it was received). The API manager may use a machine learning model, as described in connection with FIGS. 4A-4B, to determine when to generate new instances and/or allocate the cache.

In some implementations, the API manager may detect, based on the traffic pattern, an abnormality associated with the at least one API. The API manager may use a machine learning model, as described in connection with FIGS. 4A-4B, to detect the abnormality. Accordingly, as shown by reference number 123b, the API manager may temporarily disable the API. For example, the API manager may detect signs of data exfiltration, an APT, a memory injection, and/or a DDoS attack and disable the API until the problem is resolved. Additionally, the API manager may generate alternate instances of the API and transmit a new configuration to the on-site devices to use the alternate instances of the API. As a result, system downtime caused by potential attacks is significantly decreased.

By using techniques as described in connection with FIGS. 1A-1F, the API manager implements APIs on-site and with AI to reduce latency and improve security. Latency is reduced because the APIs are provisioned closer to the on-site devices. Additionally, as described above, the API manager may use AI to provisional additional API instances and/or cache inputs in order to reduce latency when traffic is high. Additionally, as described above, the API manager may use AI to monitor analytics associated with the set of APIs and thus detect and mitigate security risks early. The analytics monitored by the API manager may also be used to improve inter-operability of the on-site devices.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2A:
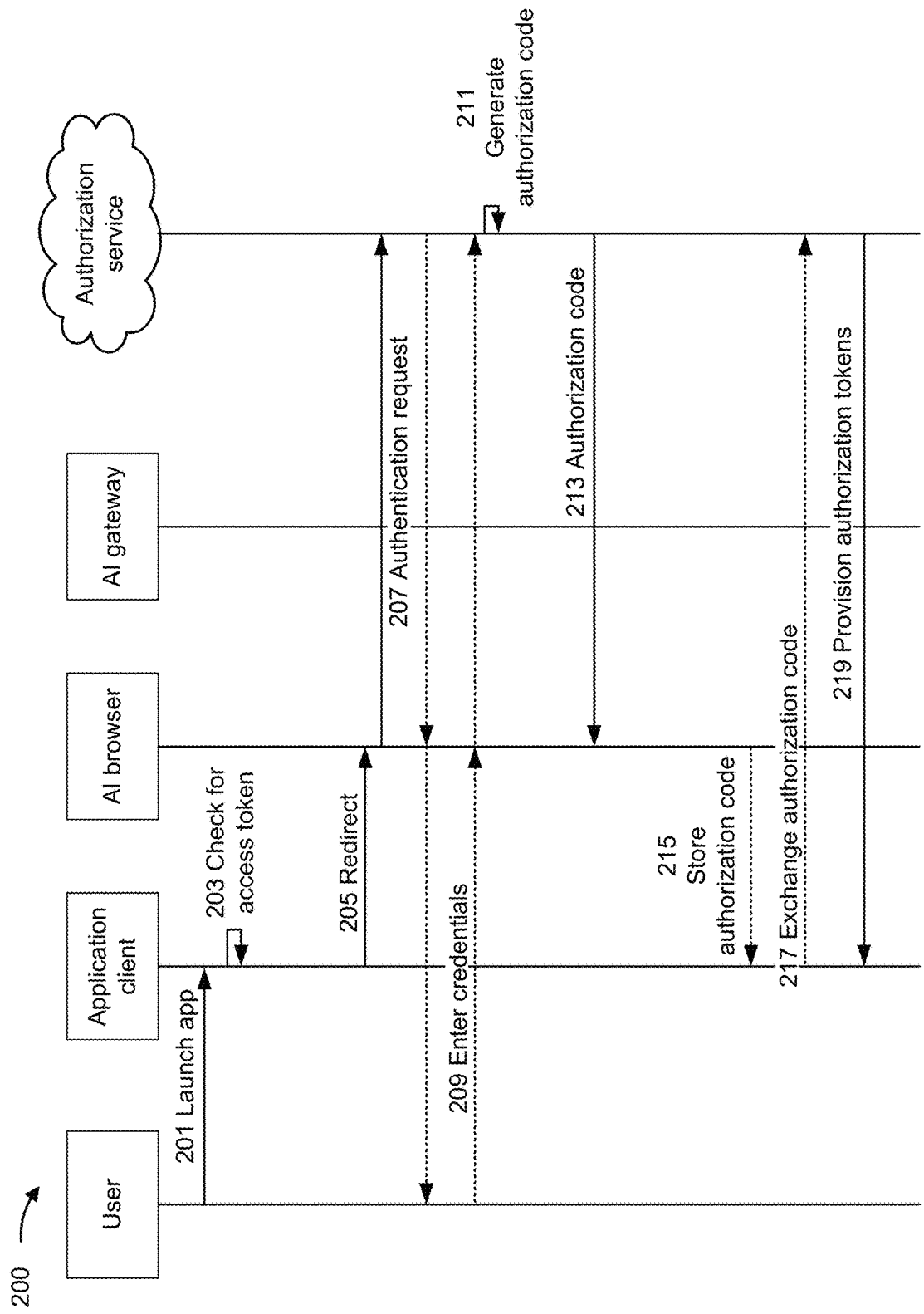
FIGS. 2A-2B are diagrams of an example implementation described herein.
Figure 2B:
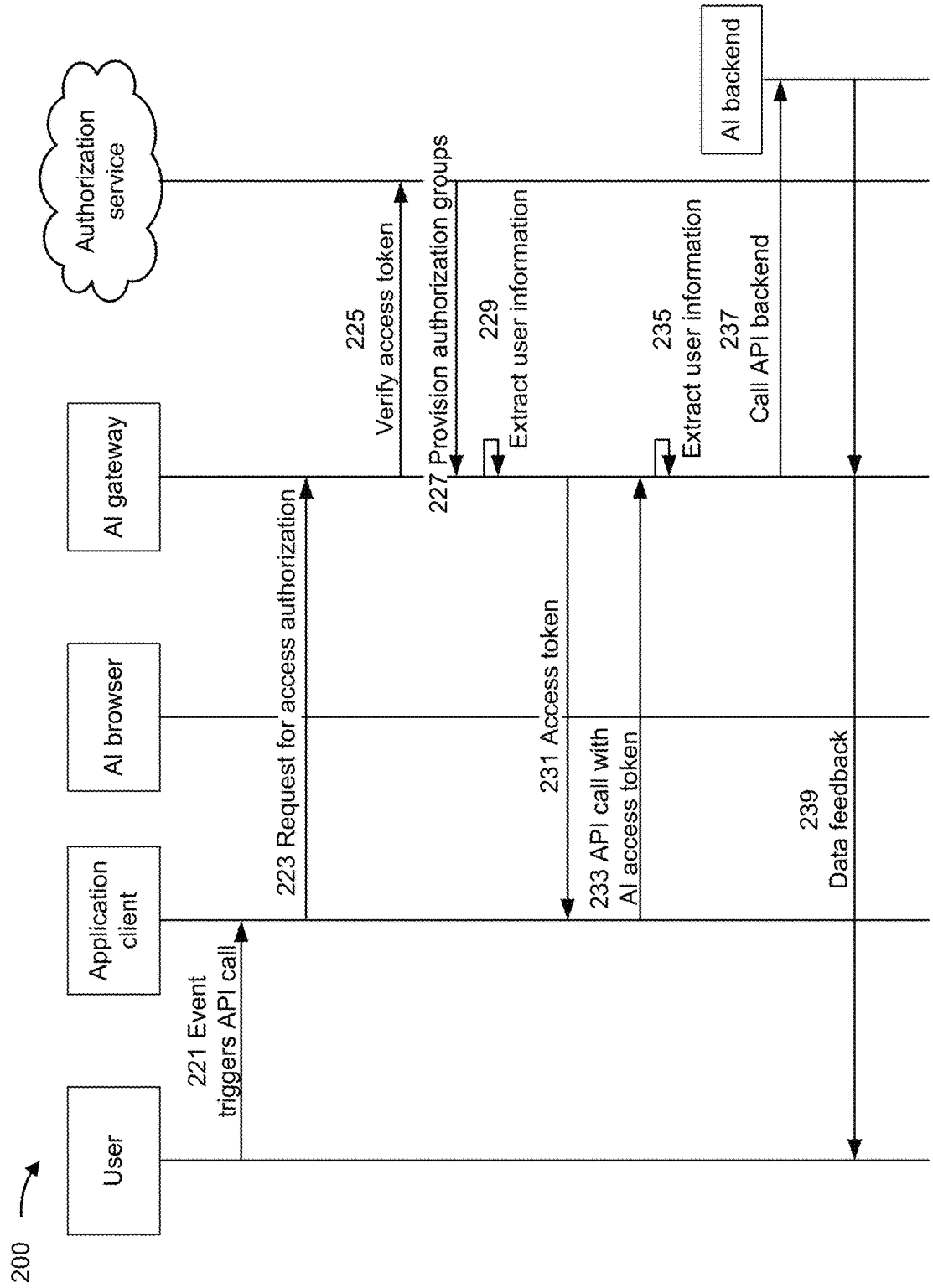

FIGS. 2A-2B are diagrams of an example 200 associated with authenticating an API manager. As shown in FIGS. 2A-2B, example 200 includes an application client, an AI browser, and an AI gateway implemented on an API manager. The API manager also receives input from a user (and/or from an on-site device). Additionally, example 200 includes an authorization service implemented on a remote server. These devices are described in more detail in connection with FIGS. 5 and 6.

As shown by reference number 201, a user may launch an application client on the API manager. As shown by reference number 203, the application client may check for an access token. Accordingly, the application client may forego authentication when the access token is already available. For example, the application client may move to perform operations described in connection with reference number 223.

When no access token is available, the application client may redirect the user to an authorization service, as shown by reference number 205. For example, as shown by reference number 207, the application client may generate and transmit a request to the authorization service, which in turn prompts the user for authentication information.

As shown by reference number 209, the user may provide credentials to the authorization service. Accordingly, as shown by reference number 211, the authorization service may generate an authorization code. For example, the authorization service may validate the credentials and generate the authorization code based on the validation. The authorization service may provide the authorization code to an AI browser (e.g., launched by and within the application client), as shown by reference number 213. As shown by reference number 215, the application client may store the authorization code received via the AI browser. Additionally, as shown by reference number 217, the application client may provide the authentication code to the authorization service in order to receive one or more authorization tokens (e.g., as shown by reference number 219).

As shown in FIG. 2B and by reference number 221, the user may trigger an API call. Alternatively, an on-site device may trigger the API call directly. Accordingly, as shown by reference number 223, the application client may request access authorization using an AI gateway (e.g., established to communicate with the authorization service after the authorization token(s) are received).

Further, as shown by reference number 225, the AI gateway may verify an access token (e.g., included in the authorization token(s)) with the authorization service. Accordingly, as shown by reference number 227, the authorization service may provision authorization groups (e.g., an access group including the application client on behalf of the user and/or the on-site device that triggered the API call). As shown by reference number 229, the AI gateway may extract user information (e.g., indicating the authorization group for the user and/or the on-site device that triggered the API call) and update the access token accordingly. Therefore, as shown by reference number 231, the AI gateway may provide the access token to the application client such that the application client, as shown by reference number 233, may perform the API call using the access token.

As shown by reference number 235, the AI gateway may extract user information (e.g., indicating the user and/or the on-site device that triggered the API call and the AI backend to call) from the API call. Accordingly, as shown by reference number 237, the AI gateway performs the API call and, as shown by reference number 239, provides data feedback (e.g., a response to the API call) to the user (e.g., for routing to the on-site device that triggered the API call).

As indicated above, FIGS. 2A-2B are provided as an example. Other examples may differ from what is described with regard to FIGS. 2A-2B.

Figure 3:
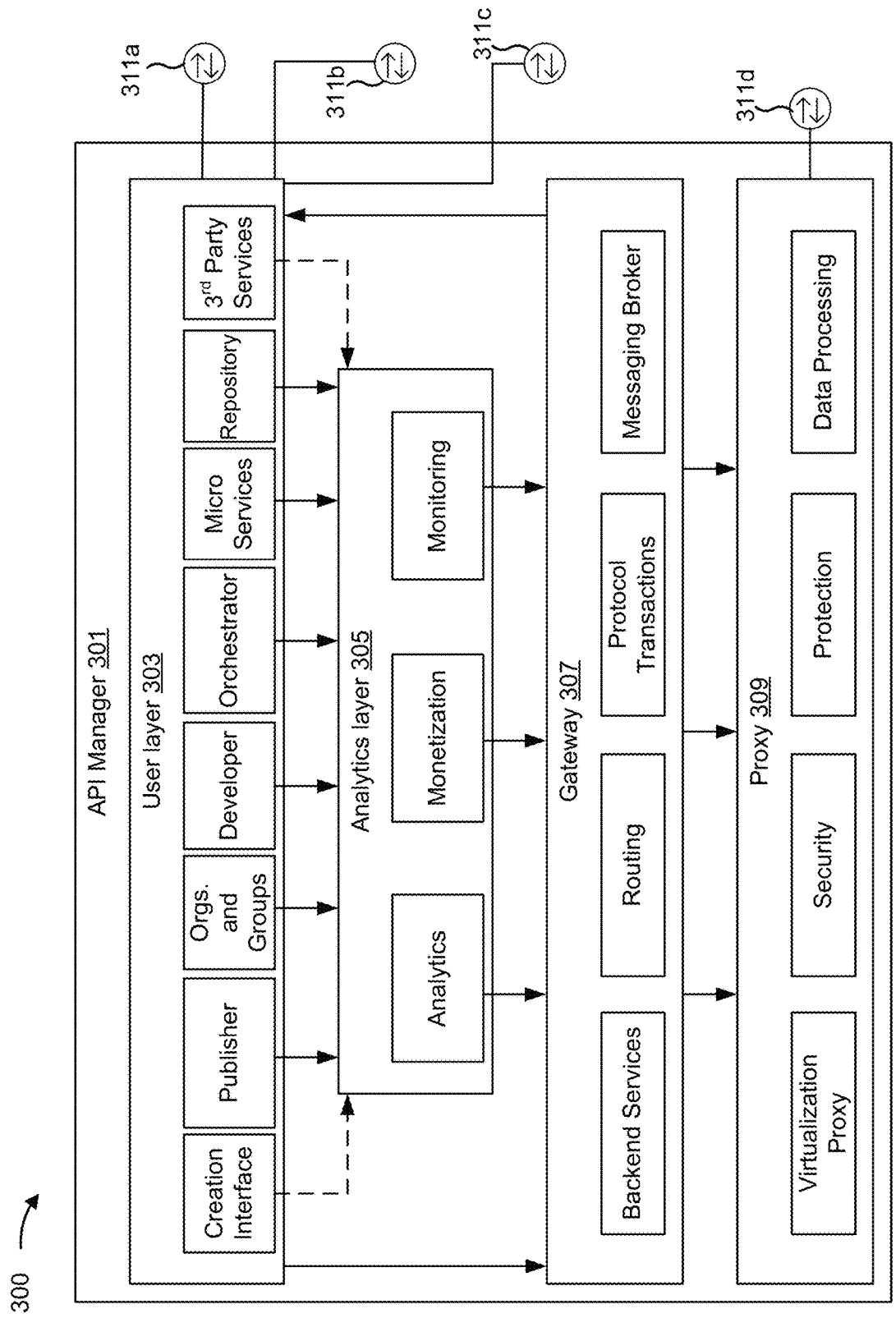
FIG. 3 is a diagram of an example architecture in which systems and/or methods described herein may be implemented.

FIG. 3 is a diagram of an example implementation 300 associated with an API manager architecture. As shown in FIG. 3, example implementation 300 includes a user layer, an analytics layer, a gateway, and a proxy implemented on an API manager. The API manager is described in more detail below in connection with FIG. 5 and FIG. 6.

As shown in FIG. 3, an API manager 301 may include a user layer 303. The user layer 303 may provide a creation interface (e.g., for generating new AI API structures), a publisher (e.g., for pushing new AI API structures to on-site devices), an organization and groups module (e.g., for tracking which on-site devices belong to which organizations or groups), a developer (e.g., for training machine learning models, as described in connection with FIGS. 4A-4B), an orchestrator (e.g., for using machine learning models, as described in connection with FIGS. 4A-4B), a microservices module (e.g., for tracking which services are provided to on-site devices via AI APIs), a repository (e.g., for storing anonymized analytics), and a third-party services module (e.g., for providing additional services through third-part applications).

Additionally, the API manager includes an analytics layer 305. The analytics layer 305 tracks analytics of the AI APIs, tracks statistics for monetization, and/or monitors health of the AI APIs. The analytics layer 305 may provide information back to the repository of the user layer 303 and/or may automatically modify and/or disable AI APIs managed by the gateway 307.

The gateway 307 may include backend services and routing (e.g., routing input from the on-site devices to corresponding remote servers and routing responses from the remote servers to corresponding on-site devices). Additionally, the gateway 307 may provide protocol translations and message brokering to allow on-site devices to use legacy protocols while the remote servers use updated protocols. The gateway 307 receives inputs and responses from the proxy 309. The proxy 309 provides endpoints for the AI APIs and thus performs data processing, security and protection (e.g., based on authentication procedures with the remote servers), and virtualization (e.g., to virtualize multiple API instances for a single API).

As shown by reference numbers 311a and 311b, the user layer 303 may communicate with remote servers associated with on-site devices and with other networks (e.g., virtual private networks (VPNs)) to access cloud services associated with on-site devices. For example, the user layer 303 may facilitate authentication as described in connection with FIGS. 2A-2B. Additionally, as shown by reference numbers 311c and 311d, the user layer 303 and the proxy 309 may communicate with the on-site devices. For example, the proxy 309 provides endpoints for the AI APIs used by the on-site devices. The user layer 303 may push API configuration updates to the on-site devices, as described in connection with FIG. 1B.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4A:
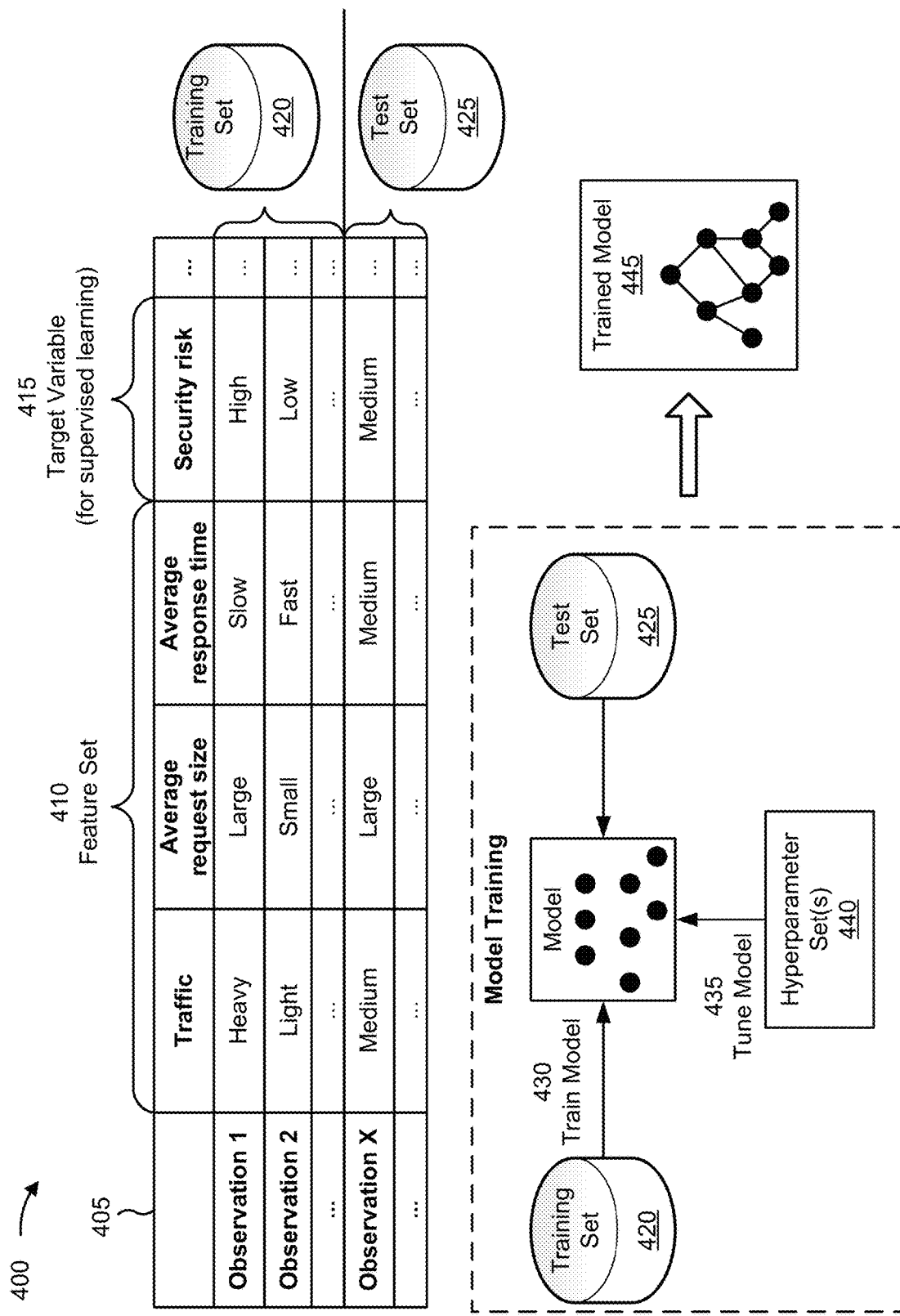
FIGS. 4A-4B are diagrams of an example of training and using a machine learning model in connection with implementations described herein.
Figure 4B:
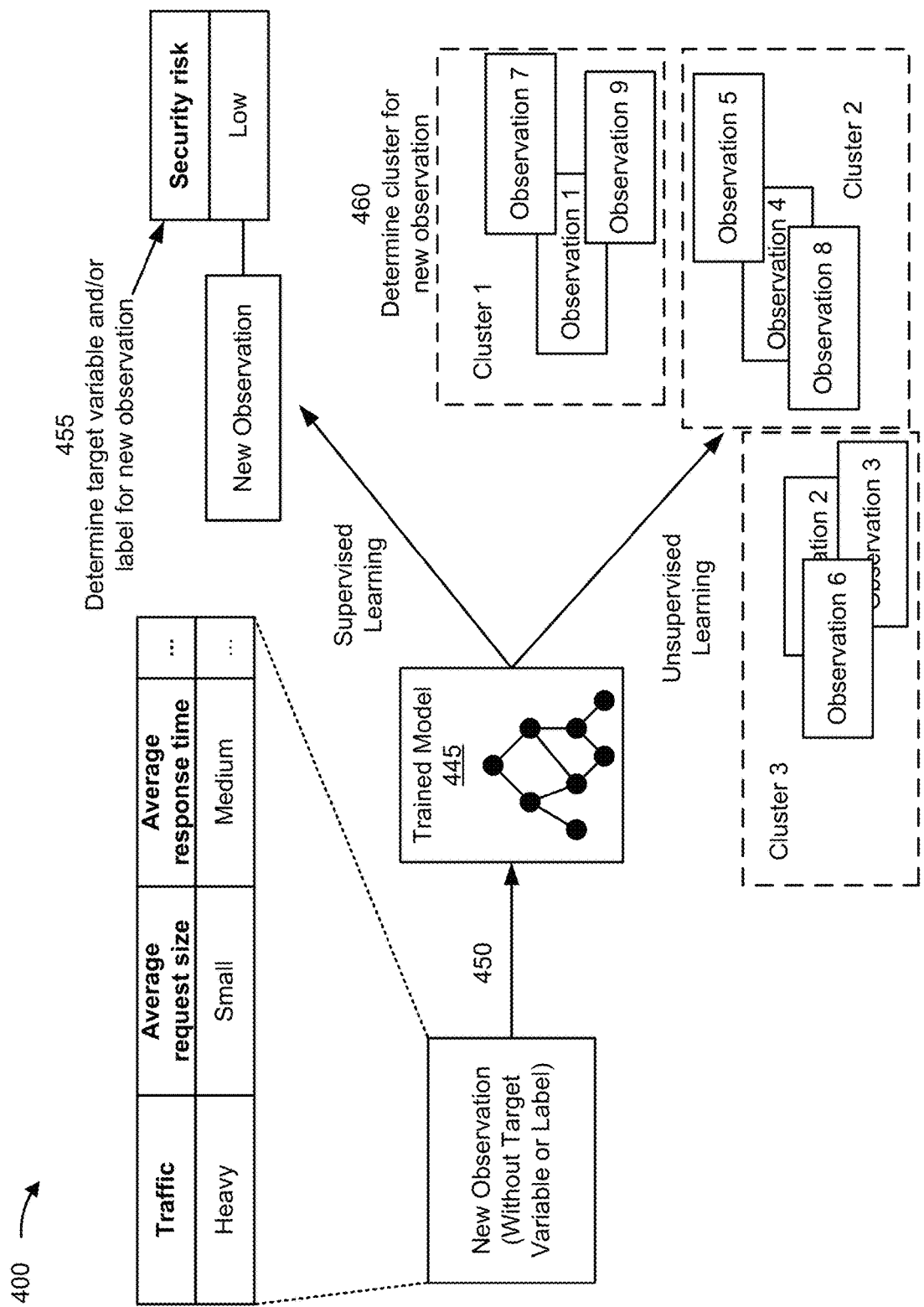

FIGS. 4A-4B are diagrams illustrating an example 400 of training and using a machine learning model in connection with using on-site AI APIs. The machine learning model training described herein may be performed using a machine learning system. The machine learning system may include or may be included in a computing device, a server, a cloud computing environment, or the like, such as the API manager described in more detail below.

As shown by reference number 405, a machine learning model may be trained using a set of observations. The set of observations may be obtained and/or input from training data (e.g., historical data), such as data gathered during one or more processes described herein. For example, the set of observations may include data gathered from an analytics layer of the API manager, as described elsewhere herein. In some implementations, the machine learning system may receive the set of observations (e.g., as input) from the API manager.

As shown by reference number 410, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the API manager. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a traffic pattern, a second feature of an average request size, a third feature of an average response size, and so on. As shown, for a first observation, the first feature may have a value of "heavy" (amongst "heavy," "light," and "medium," or other similar categories), the second feature may have a value of "large" (amongst "large," "small," and "medium," or other similar categories), the third feature may have a value of "slow" (amongst "slow," "fast," and "medium," or other similar categories), and so on. These features and feature values are provided as examples, and may differ in other examples. For example, the feature set may include one or more of the following features: source addresses (e.g., IP addresses, MAC addresses, machine names, and/or other source identifiers), destination addresses (e.g., IP addresses, MAC addresses, machine names, and/or other source identifiers), error rates (e.g., block error rates (BLERs), dropped packets over time, and/or other similar error measurements), and/or total traffic (e.g., over a period of time), among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 415, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 400, the target variable is a security risk, which has a value of "high" (amongst "high," "low," and "medium," or other similar categories) for the first observation. Additionally, or alternatively, any of the categories shown in example 400 may instead comprise numeric measures, such as a traffic size in kilobytes (KB) or megabytes (MB), an average request size in KB or MB, an average response time in microseconds (ms) or seconds, and/or a security risk score (e.g., out of 10, out of 100, and/or another base).

The feature set and target variable described above are provided as examples, and other examples may differ from what is described above. For example, for a target variable of whether to increase API instances and/or implement a cache, the feature set may include a traffic pattern, an average request size, an average response time, source addresses, destination addresses, error rates, and/or total traffic, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 420 that includes a first subset of observations, of the set of observations, and a test set 425 that includes a second subset of observations of the set of observations. The training set 420 may be used to train (e.g., fit or tune) the machine learning model, while the test set 425 may be used to evaluate a machine learning model that is trained using the training set 420. For example, for supervised learning, the test set 425 may be used for initial model training using the first subset of observations, and the test set 425 may be used to test whether the trained model accurately predicts target variables in the second subset of observations. In some implementations, the machine learning system may partition the set of observations into the training set 420 and the test set 425 by including a first portion or a first percentage of the set of observations in the training set 420 (e.g., 75%, 80%, or 85%, among other examples) and including a second portion or a second percentage of the set of observations in the test set 425 (e.g., 25%, 20%, or 15%, among other examples). In some implementations, the machine learning system may randomly select observations to be included in the training set 420 and/or the test set 425.

As shown by reference number 430, the machine learning system may train a machine learning model using the training set 420. This training may include executing, by the machine learning system, a machine learning algorithm to determine a set of model parameters based on the training set 420. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 420). For example, for a regression algorithm, a model parameter may include a regression coefficient (e.g., a weight). For a decision tree algorithm, a model parameter may include a decision tree split location, as an example.

As shown by reference number 435, the machine learning system may use one or more hyperparameter sets 440 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 420. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 420. The machine learning system may tune each machine learning algorithm using one or more hyperparameter sets 440 (e.g., based on operator input that identifies hyperparameter sets 440 to be used and/or based on randomly generating hyperparameter values). The machine learning system may train a particular machine learning model using a specific machine learning algorithm and a corresponding hyperparameter set 440. In some implementations, the machine learning system may train multiple machine learning models to generate a set of model parameters for each machine learning model, where each machine learning model corresponds to a different combination of a machine learning algorithm and a hyperparameter set 440 for that machine learning algorithm.

In some implementations, the machine learning system may perform cross-validation when training a machine learning model. Cross validation can be used to obtain a reliable estimate of machine learning model performance using only the training set 420, and without using the test set 425, such as by splitting the training set 420 into a number of groups (e.g., based on operator input that identifies the number of groups and/or based on randomly selecting a number of groups) and using those groups to estimate model performance. For example, using k-fold cross-validation, observations in the training set 420 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 440 associated with a particular machine learning algorithm. The machine learning system may compare the overall cross-validation scores for different hyperparameter sets 440 associated with the particular machine learning algorithm, and may select the hyperparameter set 440 with the best (e.g., highest accuracy, lowest error, or closest to a desired threshold) overall cross-validation score for training the machine learning model. The machine learning system may then train the machine learning model using the selected hyperparameter set 440, without cross-validation (e.g., using all of data in the training set 420 without any hold-out groups), to generate a single machine learning model for a particular machine learning algorithm. The machine learning system may then test this machine learning model using the test set 425 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 445 to be used to analyze new observations, as described below in connection with FIG. 5.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 420 (e.g., without cross-validation), and may test each machine learning model using the test set 425 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 445.

FIG. 4B shows applying the trained machine learning model 445 to a new observation. As shown by reference number 450, the machine learning system may receive a new observation (or a set of new observations), and may input the new observation to the machine learning model 445. As shown, the new observation may include a first feature of "heavy" traffic, a second feature of a "small" average request size, a third feature of a "medium" average response time, and so on, as an example. The machine learning system may apply the trained machine learning model 445 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 445 may predict a value of "low" for the target variable of security risk for the new observation, as shown by reference number 455. Based on this prediction (e.g., based on the value having a particular label or classification or based on the value satisfying or failing to satisfy a threshold), the machine learning system may provide a recommendation and/or output for determination of a recommendation, such as a recommendation not to disable an API associated with the new observation. Additionally, or alternatively, the machine learning system may perform an automated action and/or may cause an automated action to be performed (e.g., by instructing another device to perform the automated action), such as leaving open the API associated with the new observation. As another example, if the machine learning system were to predict a value of "high" for the target variable of security risk, then the machine learning system may provide a different recommendation (e.g., a recommendation to disable an API associated with the new observation) and/or may perform or cause performance of a different automated action (e.g., disabling the API associated with the new observation). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 445 may classify (e.g., cluster) the new observation in a cluster, as shown by reference number 460. The observations within a cluster may have a threshold degree of similarity. As an example, if the machine learning system classifies the new observation in a first cluster (e.g., higher security risk), then the machine learning system may provide a first recommendation, such as a recommendation to disable the API associated with the new observation. Additionally, or alternatively, the machine learning system may perform a first automated action and/or may cause a first automated action to be performed (e.g., by instructing another device to perform the automated action) based on classifying the new observation in the first cluster, such as disabling the API associated with the new observation. As another example, if the machine learning system were to classify the new observation in a second cluster (e.g., lower security risk), then the machine learning system may provide a second (e.g., different) recommendation (e.g., a recommendation not to disable the API associated with the new observation) and/or may perform or cause performance of a second (e.g., different) automated action, such as leaving open the API associated with the new observation.

The recommendations, actions, and clusters described above are provided as examples, and other examples may differ from what is described above. For example, the recommendations associated with a heavy traffic cluster may include a recommendation to generate more instances of the API associated with the new observation and/or to provision a cache for the API associated with the new observation. The actions associated with the heavy traffic cluster may include, for example, spinning up new instances of the API associated with the new observation and/or allocating a cache for the API associated with the new observation. In another example, the recommendations associated with a light traffic cluster may include a recommendation to reduce instances of the API associated with the new observation and/or to close a cache for the API associated with the new observation. The actions associated with the light traffic cluster may include, for example, closing one or more instances of the API associated with the new observation and/or de-allocating a cache for the API associated with the new observation.

In this way, the machine learning system may apply a rigorous and automated process to managing traffic at APIs. The machine learning system enables recognition and/or identification of tens, hundreds, thousands, or millions of features and/or feature values for tens, hundreds, thousands, or millions of observations, thereby increasing accuracy and consistency and reducing delay associated with managing API traffic relative to requiring computing resources to be allocated for tens, hundreds, or thousands of operators to manually modifying APIs based on traffic using the features or feature values.

As indicated above, FIGS. 4A-4B are provided as an example. Other examples may differ from what is described in connection with FIGS. 4A-4B. For example, the machine learning model may be trained using a different process than what is described in connection with FIGS. 4A-4B. Additionally, or alternatively, the machine learning model may employ a different machine learning algorithm than what is described in connection with FIGS. 4A-4B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 5:
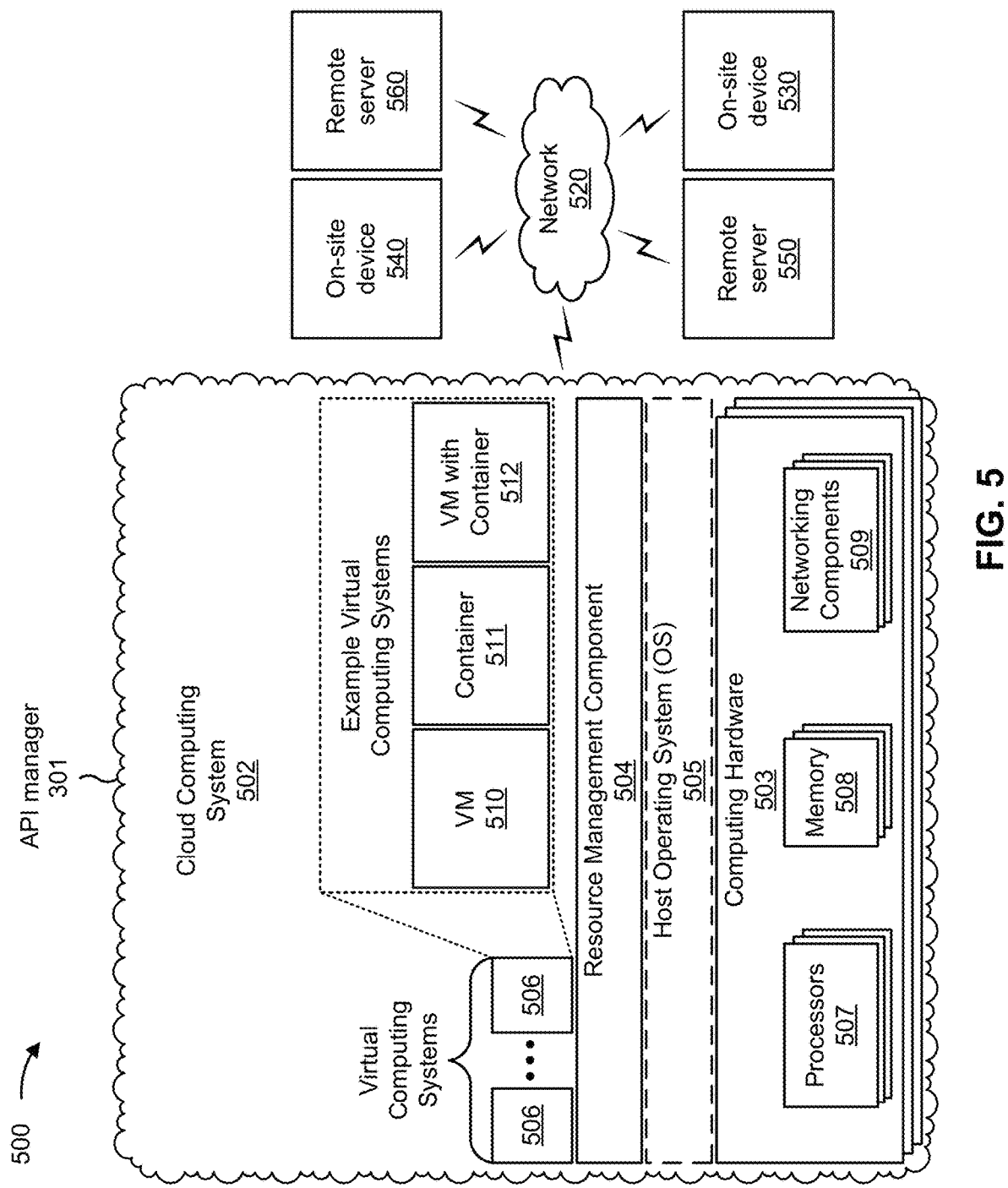
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include an API manager 301, which may include one or more elements of and/or may execute within a cloud computing system 502. The cloud computing system 502 may include one or more elements 503-512, as described in more detail below. As further shown in FIG. 5, environment 500 may include a network 520, one or more on-site devices 530 and 540, and/or one or more remote servers 550 and 560.

Devices and/or elements of environment 500 may interconnect via wired connections and/or wireless connections.

The cloud computing system 502 includes computing hardware 503, a resource management component 504, a host operating system (OS) 505, and/or one or more virtual computing systems 506. The cloud computing system 502 may execute on, for example, an Amazon Web Services platform, a Microsoft Azure platform, or a Snowflake platform. The resource management component 504 may perform virtualization (e.g., abstraction) of computing hardware 503 to create the one or more virtual computing systems 506. Using virtualization, the resource management component 504 enables a single computing device (e.g., a computer or a server) to operate like multiple computing devices, such as by creating multiple isolated virtual computing systems 506 from computing hardware 503 of the single computing device. In this way, computing hardware 503 can operate more efficiently, with lower power consumption, higher reliability, higher availability, higher utilization, greater flexibility, and lower cost than using separate computing devices.

Computing hardware 503 includes hardware and corresponding resources from one or more computing devices. For example, computing hardware 503 may include hardware from a single computing device (e.g., a single server) or from multiple computing devices (e.g., multiple servers), such as multiple computing devices in one or more data centers. As shown, computing hardware 503 may include one or more processors 507, one or more memories 508, and/or one or more networking components 509. Examples of a processor, a memory, and a networking component (e.g., a communication component) are described elsewhere herein.

The resource management component 504 includes a virtualization application (e.g., executing on hardware, such as computing hardware 503) capable of virtualizing computing hardware 503 to start, stop, and/or manage one or more virtual computing systems 506. For example, the resource management component 504 may include a hypervisor (e.g., a bare-metal or Type 1 hypervisor, a hosted or Type 2 hypervisor, or another type of hypervisor) or a virtual machine monitor, such as when the virtual computing systems 506 are virtual machines 510. Additionally, or alternatively, the resource management component 504 may include a container manager, such as when the virtual computing systems 506 are containers 511. In some implementations, the resource management component 504 executes within and/or in coordination with a host operating system 505.

A virtual computing system 506 includes a virtual environment that enables cloud-based execution of operations and/or processes described herein using computing hardware 503. As shown, a virtual computing system 506 may include a virtual machine 510, a container 511, or a hybrid environment 512 that includes a virtual machine and a container, among other examples. A virtual computing system 506 may execute one or more applications using a file system that includes binary files, software libraries, and/or other resources required to execute applications on a guest operating system (e.g., within the virtual computing system 506) or the host operating system 505.

Although the API manager 301 may include one or more elements 503-512 of the cloud computing system 502, may execute within the cloud computing system 502, and/or may be hosted within the cloud computing system 502, in some implementations, the API manager 301 may not be cloud-based (e.g., may be implemented outside of a cloud computing system) or may be partially cloud-based. For example, the API manager 301 may include one or more devices that are not part of the cloud computing system 502, such as device 600 of FIG. 6, which may include a stand-alone server or another type of computing device. The API manager 301 may perform one or more operations and/or processes described in more detail elsewhere herein.

Network 520 includes one or more wired and/or wireless networks. For example, network 520 may include a cellular network, a public land mobile network (PLMN), a local area network (LAN), a wide area network (WAN), a private network, the Internet, and/or a combination of these or other types of networks. The network 520 enables communication among the devices of environment 500.

The on-site devices 530 and 540 each include one or more devices capable of receiving, generating, storing, processing, and/or providing information, as described elsewhere herein. The on-site devices 530 and 540 may include a communication device and/or a computing device. For example, the on-site devices 530 and 540 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. Additionally, or alternatively, the on-site devices 530 and 540 may include a camera and/or another type of audio and/or video sensor, a PoS system, a local database system, and/or a scanner device, among other examples. The on-site devices 530 and 540 may communicate with APIs provisioned by the API manager 301, as described herein.

The remote servers 550 and 560 each include one or more devices capable of receiving, generating, storing, processing, providing, and/or routing information, as described elsewhere herein. The remote servers 550 and 560 may include a communication device and/or a computing device. For example, the remote servers 550 and 560 may include a server, such as an application server, a client server, a web server, a database server, a host server, a proxy server, a virtual server (e.g., executing on computing hardware), or a server in a cloud computing system. In some implementations, the remote servers 550 and 560 include computing hardware used in a cloud computing environment. The remote servers 550 and 560 communicate with the on-site devices 530 and 540 via the API manager 301, as described herein.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
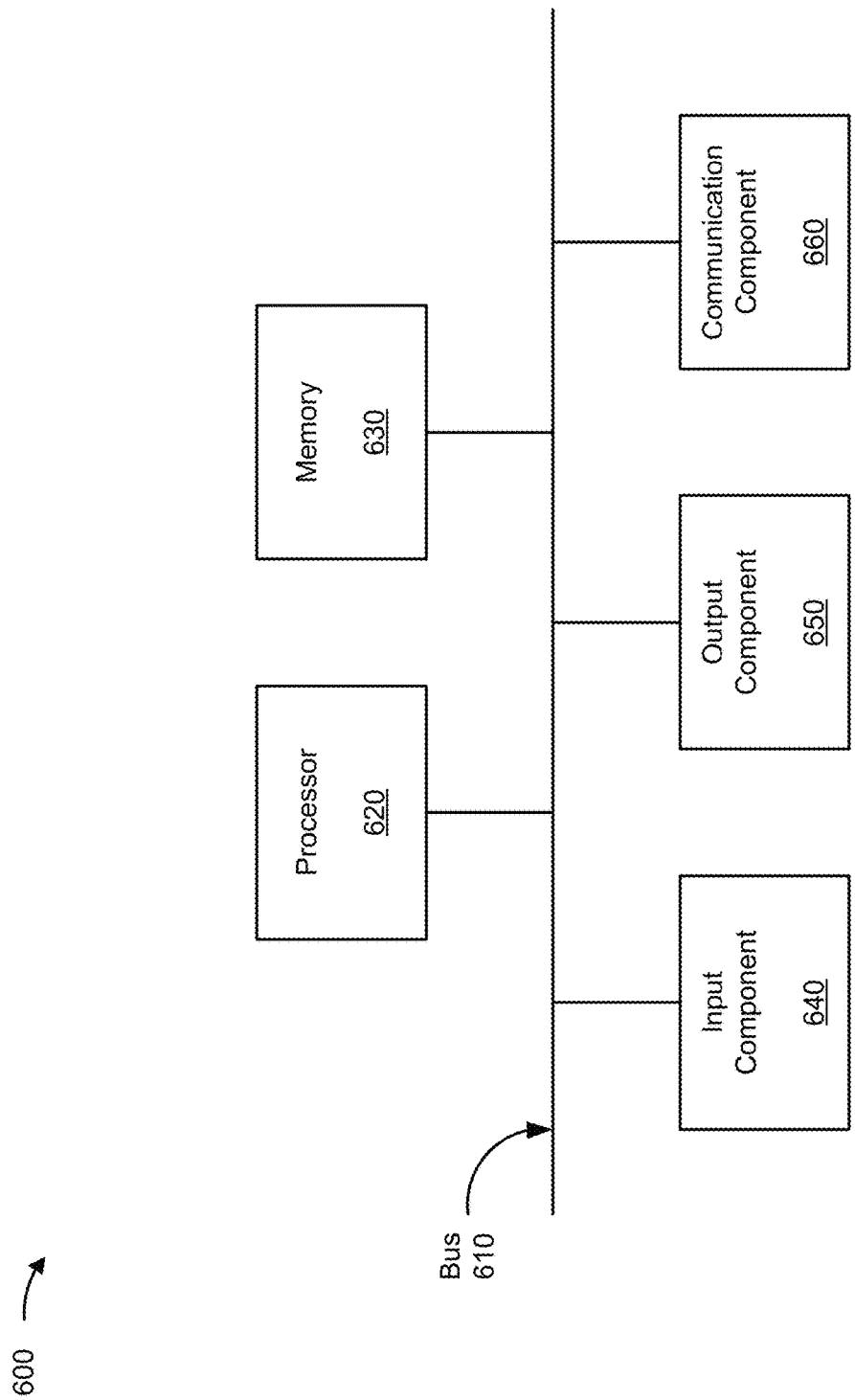
FIG. 6 is a diagram of example components of one or more devices of FIG. 5.

FIG. 6 is a diagram of example components of a device 600, which may correspond to an on-site device and/or a remote server. In some implementations, an on-site device and/or a remote server may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
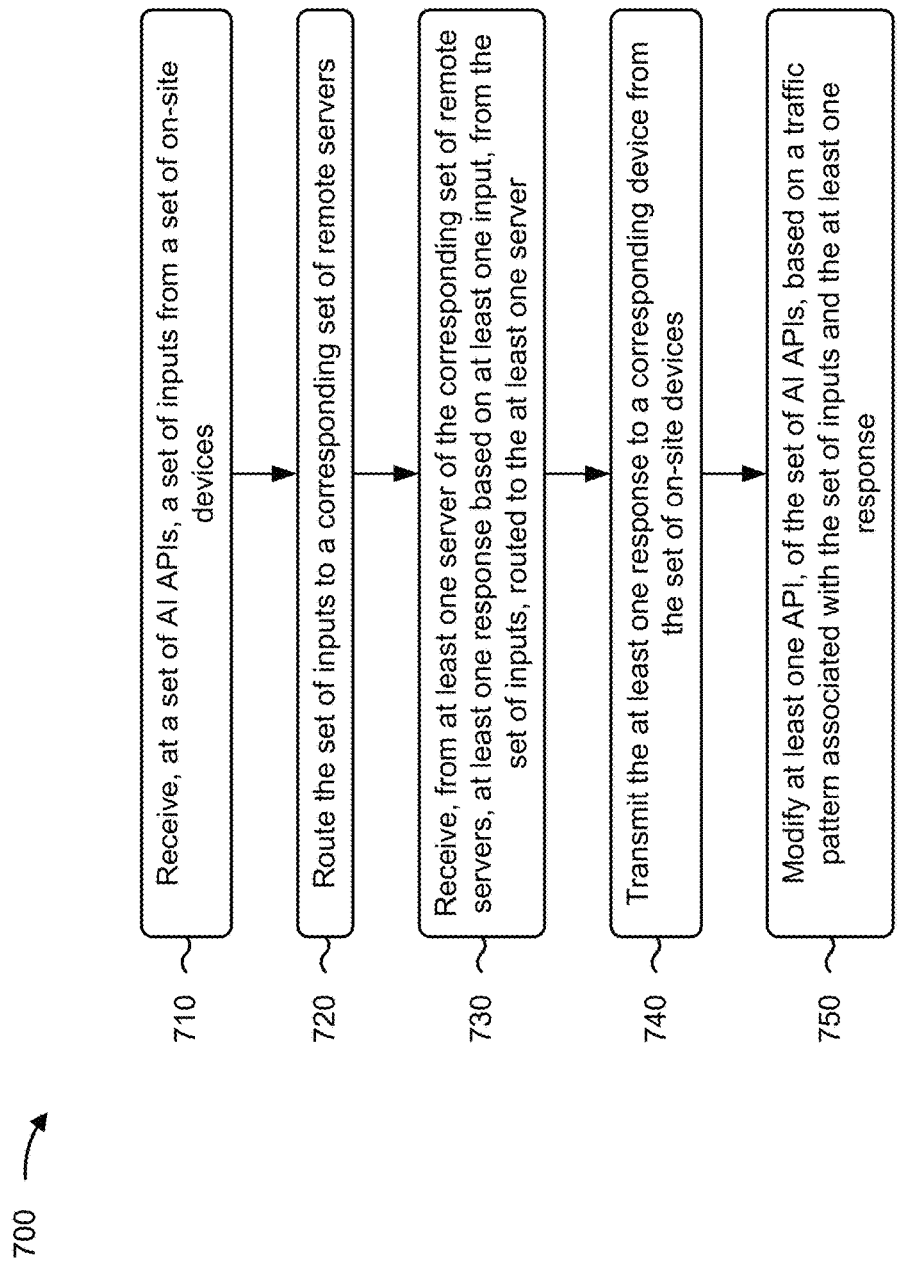
FIG. 7 is a flowchart of an example process relating to using on-site artificial intelligence application programming interfaces.

FIG. 7 is a flowchart of an example process 700 associated with using on-site AI APIs for routing and adapting traffic. In some implementations, one or more process blocks of FIG. 7 are performed by a system (e.g., API manager 301). In some implementations, one or more process blocks of FIG. 7 are performed by another device or a group of devices separate from or including the system, such as on-site devices and/or remote servers. Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving, at a set of AI APIs, a set of inputs from a set of on-site devices (block 710). For example, the API manger may receive, at a set of AI APIs, a set of inputs from a set of on-site devices, as described herein.

As further shown in FIG. 7, process 700 may include routing the set of inputs to a corresponding set of remote servers (block 720). For example, the API manager may route the set of inputs to a corresponding set of remote servers, as described herein.

As further shown in FIG. 7, process 700 may include receiving, from at least one server of the corresponding set of remote servers, at least one response based on at least one input, from the set of inputs, routed to the at least one server (block 730). For example, the API manager may receive, from at least one server of the corresponding set of remote servers, at least one response based on at least one input, from the set of inputs, routed to the at least one server, as described herein.

As further shown in FIG. 7, process 700 may include transmitting the at least one response to a corresponding device from the set of on-site devices (block 740). For example, the API manager may transmit the at least one response to a corresponding device from the set of on-site devices, as described herein.

As further shown in FIG. 7, process 700 may include modifying at least one API, of the set of AI APIs, based on a traffic pattern associated with the set of inputs and the at least one response (block 750). For example, the API manager may modify at least one API, of the set of AI APIs, based on a traffic pattern associated with the set of inputs and the at least one response, as described herein.

Process 700 may include additional implementations, such as any single implementation or any combination of implementations described below and/or in connection with one or more other processes described elsewhere herein.

In a first implementation, modifying the at least one API includes generating at least one new instance of the at least one API based on the traffic pattern.

In a second implementation, alone or in combination with the first implementation, modifying the at least one API includes allocating at least one cache associated with the at least one API based on the traffic pattern.

In a third implementation, alone or in combination with one or more of the first and second implementations, process 700 further includes performing a set of authentication procedures with the set of remote servers, receiving a set of access tokens based on the set of authentication procedures, and transmitting the set of inputs using the set of access tokens.

In a fourth implementation, alone or in combination with one or more of the first through third implementations, process 700 further includes encrypting at least one input, from the set of inputs, based on a corresponding access token of the set of access tokens associated with a corresponding server of the set of remote servers.

In a fifth implementation, alone or in combination with one or more of the first through fourth implementations, process 700 further includes translating at least one input, from the set of inputs, from a first protocol associated with a corresponding device of the set of on-site devices to a second protocol associated with a corresponding server of the set of remote servers.

In a sixth implementation, alone or in combination with one or more of the first through fifth implementations, translating the at least one input from the first protocol to the second protocol includes reorganizing data of the at least one input from a first structure associated with the first protocol into a second structure associated with the second protocol.

In a seventh implementation, alone or in combination with one or more of the first through sixth implementations, translating the at least one input from the first protocol to the second protocol includes exchanging one or more messages with the corresponding server according to the second protocol based on one or more messages exchanged with the corresponding device according to the first protocol.

In an eighth implementation, alone or in combination with one or more of the first through seventh implementations, process 700 further includes anonymizing at least a portion of the set of inputs, and storing the anonymized portion for analytics.

In a ninth implementation, alone or in combination with one or more of the first through eighth implementations, process 700 further includes detecting, based on the traffic pattern, an abnormality associated with the at least one API, wherein modifying the at least one API comprises temporarily disabling the at least one API.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    transmitting, based on performing at least one of a first set of authentication procedures with a set of on-set devices, corresponding indications, of application programming interfaces (API) configurations, to the set of on-site devices;
    receiving, at a set of artificial intelligence (AI) APIs and based on transmitting the corresponding indications of the API configurations, a set of inputs from the set of on-site devices;
    routing the set of inputs to a corresponding set of remote servers;
    receiving, from at least one server of the corresponding set of remote servers, at least one response based on at least one input, from the set of inputs, routed to the at least one server;
    transmitting, using the set of AI APIs, the at least one response to a corresponding device from the set of on-site devices; and
    modifying at least one API, of the set of AI APIs, based on a traffic pattern associated with the set of inputs and the at least one response.

2. The method of claim 1, wherein modifying the at least one API comprises:
    generating at least one new instance of the at least one API based on the traffic pattern.

3. The method of claim 1, wherein modifying the at least one API comprises:
    allocating at least one cache associated with the at least one API based on the traffic pattern.

4. The method of claim 1, further comprising:
    performing a second set of authentication procedures with the set of remote servers;

receiving a set of access tokens based on the second set of authentication procedures; and transmitting the set of inputs using the set of access tokens.

5. The method of claim 4, further comprising:

encrypting at least one input, from the set of inputs, based on a corresponding access token of the set of access tokens associated with a corresponding server of the set of remote servers.

6. The method of claim 1, further comprising:

translating at least one input, from the set of inputs, from a first protocol associated with a corresponding device of the set of on-site devices to a second protocol associated with a corresponding server of the set of remote servers.

7. The method of claim 6, wherein translating the at least one input from the first protocol to the second protocol comprises:

reorganizing data of the at least one input from a first structure associated with the first protocol into a second structure associated with the second protocol.

8. The method of claim 6, wherein translating the at least one input from the first protocol to the second protocol comprises:

exchanging one or more messages with the corresponding server according to the second protocol based on one or more messages exchanged with the corresponding device according to the first protocol.

9. The method of claim 1, further comprising:

anonymizing at least a portion of the set of inputs; and storing the anonymized portion for analytics.

10. The method of claim 1, further comprising:

detecting, based on the traffic pattern, an abnormality associated with the at least one API, wherein modifying the at least one API comprises temporarily disabling the at least one API.

11. A device, comprising:

one or more memories; and one or more processors, coupled to the one or more memories, configured to:

transmit, based on performing at least one of a first set of authentication procedures with a set of on-set devices, corresponding indications, of application programming interfaces (API) configurations, to the set of on-site devices;

receive, at a set of artificial intelligence (AI) APIs and based on transmitting the corresponding indications of the API configurations, a set of inputs from the set of on-site devices;

route the set of inputs to a corresponding set of remote servers;

receive, from at least one server of the corresponding set of remote servers, at least one response based on at least one input, from the set of inputs, routed to the at least one server;

transmit, using the set of AI APIs, the at least one response to a corresponding device from the set of on-site devices; and modify at least one API, of the set of AI APIs, based on a traffic pattern associated with the set of inputs and the at least one response.

12. The device of claim 11, wherein the one or more processors, to modify the at least one API, are configured to:

generate at least one new instance of the at least one API based on the traffic pattern.

13. The device of claim 11, wherein the one or more processors, to modify the at least one API, are configured to:

allocate at least one cache associated with the at least one API based on the traffic pattern.

14. The device of claim 11, wherein the one or more processors are further configured to:

perform a second set of authentication procedures with the set of remote servers;

receive a set of access tokens based on the second set of authentication procedures; and transmit the set of inputs using the set of access tokens.

15. The device of claim 14, wherein the one or more processors are further configured to:

encrypt at least one input, from the set of inputs, based on a corresponding access token of the set of access tokens associated with a corresponding server of the set of remote servers.

16. The device of claim 11, wherein the one or more processors are further configured to:

translate at least one input, from the set of inputs, from a first protocol associated with a corresponding device of the set of on-site devices to a second protocol associated with a corresponding server of the set of remote servers.

17. The device of claim 16, where the one or more processors, to translate the at least one input from the first protocol to the second protocol, are configured to:

reorganize data of the at least one input from a first structure associated with the first protocol into a second structure associated with the second protocol.

18. The device of claim 16, where the one or more processors, to translate the at least one input from the first protocol to the second protocol, are configured to:

exchange one or more messages with the corresponding server according to the second protocol based on one or more messages exchanged with the corresponding device according to the first protocol.

19. The device of claim 11, wherein the one or more processors are further configured to:

detect, based on the traffic pattern, an abnormality associated with the at least one API, wherein the at least one API is modified by being temporarily disabled.

20. A non-transitory computer-readable medium storing a set of instructions, the set of instructions comprising:

one or more instructions that, when executed by one or more processors of a device, cause the device to:

transmit, based on performing at least one of a first set of authentication procedures with a set of on-set devices, corresponding indications, of application programming interfaces (API) configurations, to the set of on-site devices;

receive, at a set of artificial intelligence (AI) APIs and based on transmitting the corresponding indications of the API configurations, a set of inputs from a set of on-site devices;

route the set of inputs to a corresponding set of remote servers;

receive, from at least one server of the corresponding set of remote servers, at least one response based on at least one input, from the set of inputs, routed to the at least one server;

transmit, using the set of AI APIs, the at least one response to a corresponding device from the set of on-site devices; and modify at least one API, of the set of AI APIs, based on a traffic pattern associated with the set of inputs and the at least one response.

* * * * *